(No Model.) 6 Sheets—Sheet 1.

W. A. & D. C. VAN BRUNT.
GRAIN DRILL.

No. 466,544. Patented Jan. 5, 1892.

Witnesses
Inventors
W. A. & D. C. Van Brunt
Attorney

THE NORRIS PETERS CO., PHOTO-LITHO., WASHINGTON, D. C.

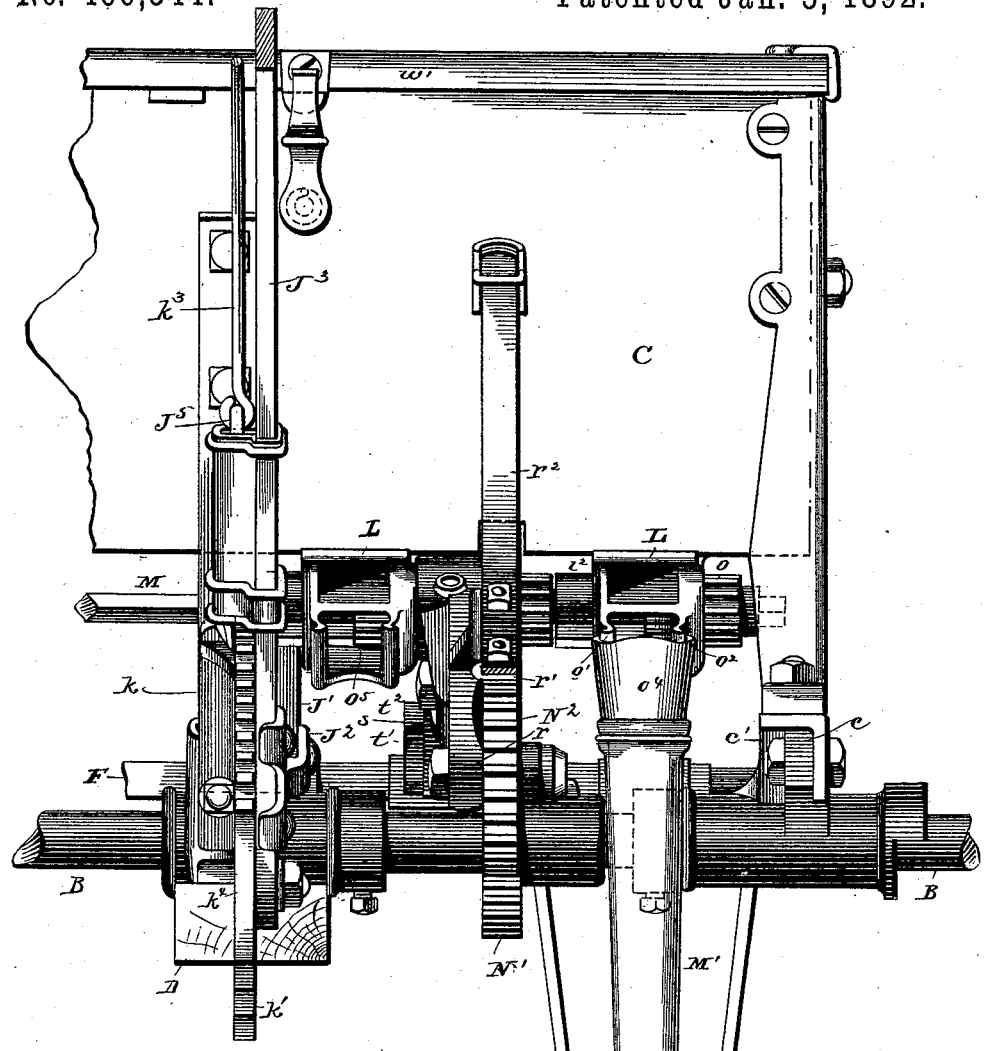

(No Model.) 6 Sheets—Sheet 3.
W. A. & D. C. VAN BRUNT.
GRAIN DRILL.
No. 466,544. Patented Jan. 5, 1892.
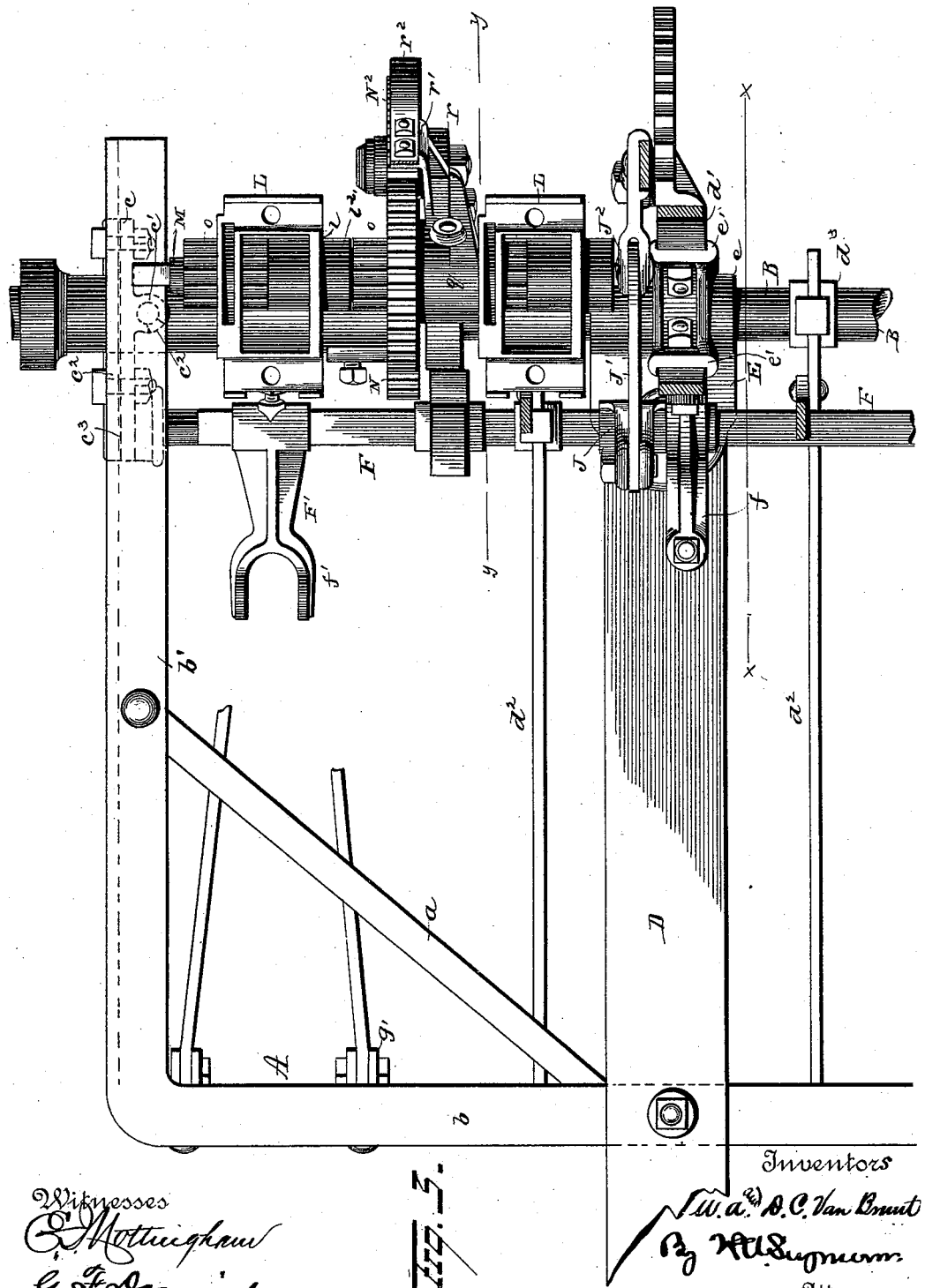

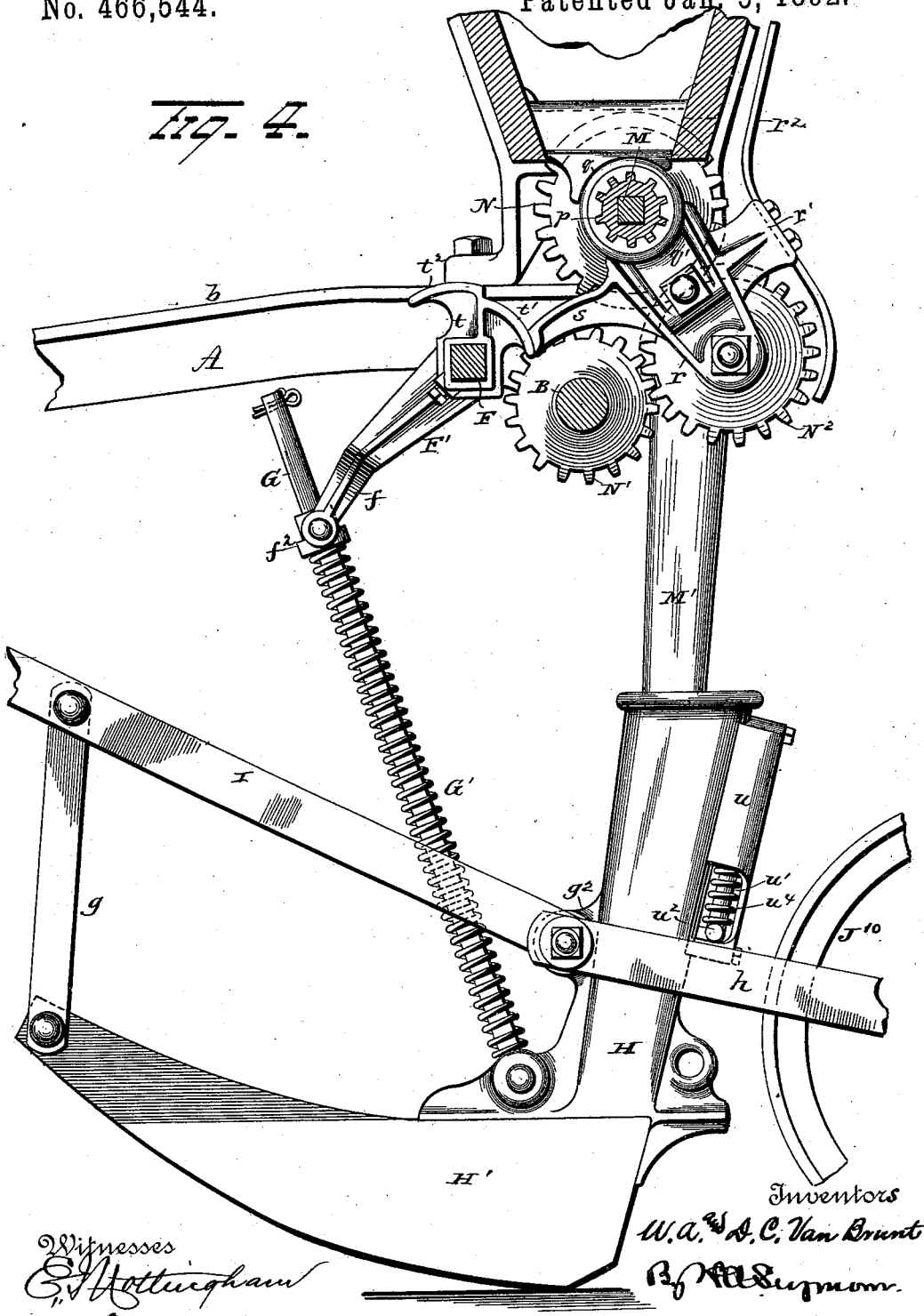

(No Model.) 6 Sheets—Sheet 5.
W. A. & D. C. VAN BRUNT.
GRAIN DRILL.
No. 466,544. Patented Jan. 5, 1892.
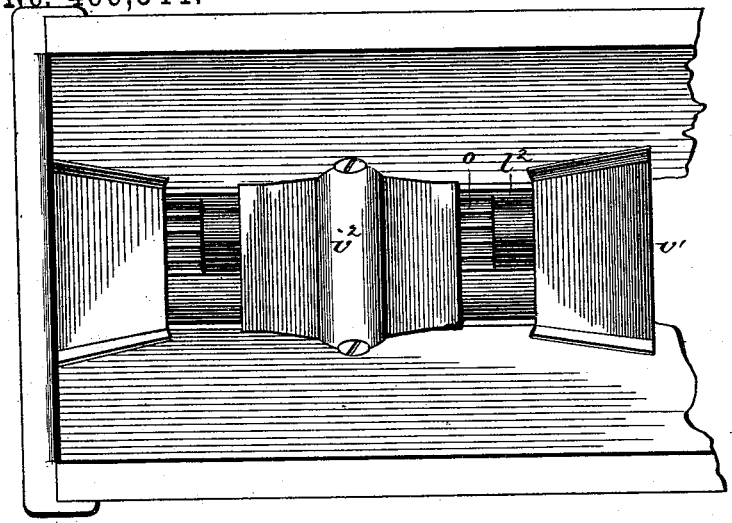
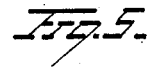
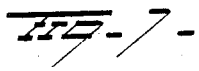
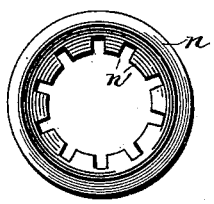
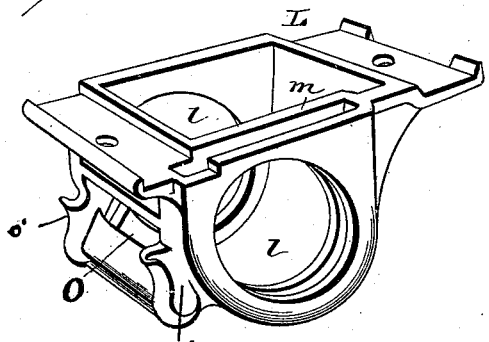
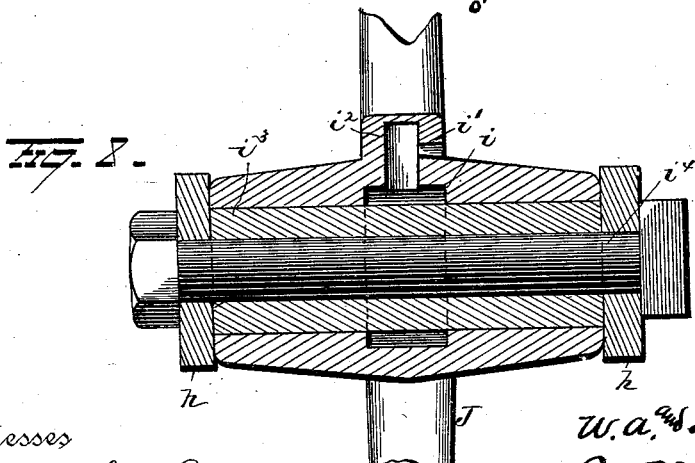

(No Model.) 6 Sheets—Sheet 6.

W. A. & D. C. VAN BRUNT.
GRAIN DRILL.

No. 466,544. Patented Jan. 5, 1892.

Witnesses

Inventors
W. A. & D. C. Van Brunt
By Attorney

UNITED STATES PATENT OFFICE.

WILLARD A. VAN BRUNT AND DANIEL C. VAN BRUNT, OF HORICON, WISCONSIN.

GRAIN-DRILL.

SPECIFICATION forming part of Letters Patent No. 466,544, dated January 5, 1892.

Application filed March 24, 1891. Serial No. 386,267. (No model.)

*To all whom it may concern:*

Be it known that we, WILLARD A. VAN BRUNT and DANIEL C. VAN BRUNT, of Horicon, in the county of Dodge and State of Wisconsin, have invented certain new and useful Improvements in Grain-Drills; and we do hereby declare the following to be a full, clear, and exact description of the invention, such as will enable others skilled in the art to which it appertains to make and use the same.

Our invention relates to an improvement in grain-drills; and it consists in certain novel features of construction and combinations and arrangements of parts, as hereinafter set forth, and pointed out in the claims.

Figure 1:
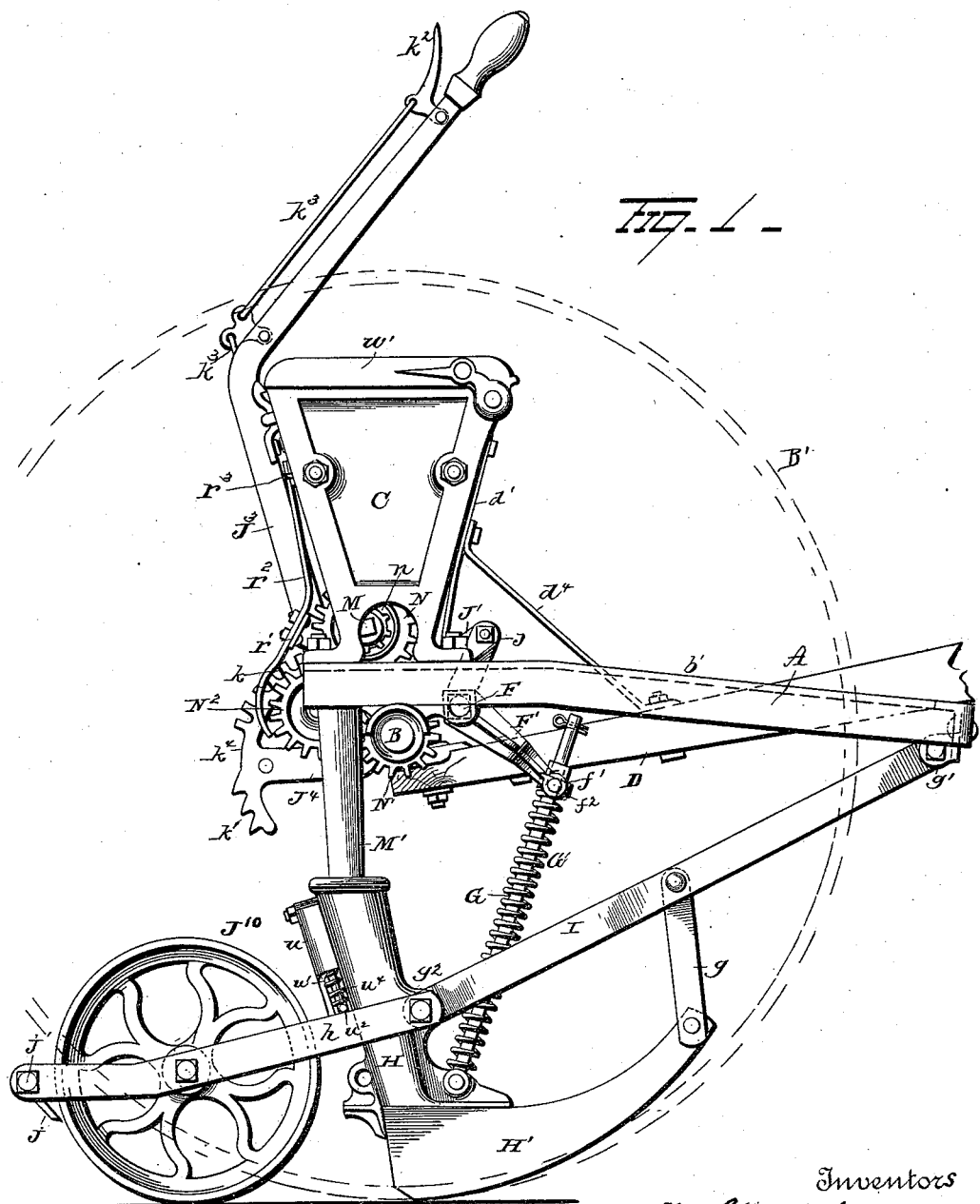
Figure 6:
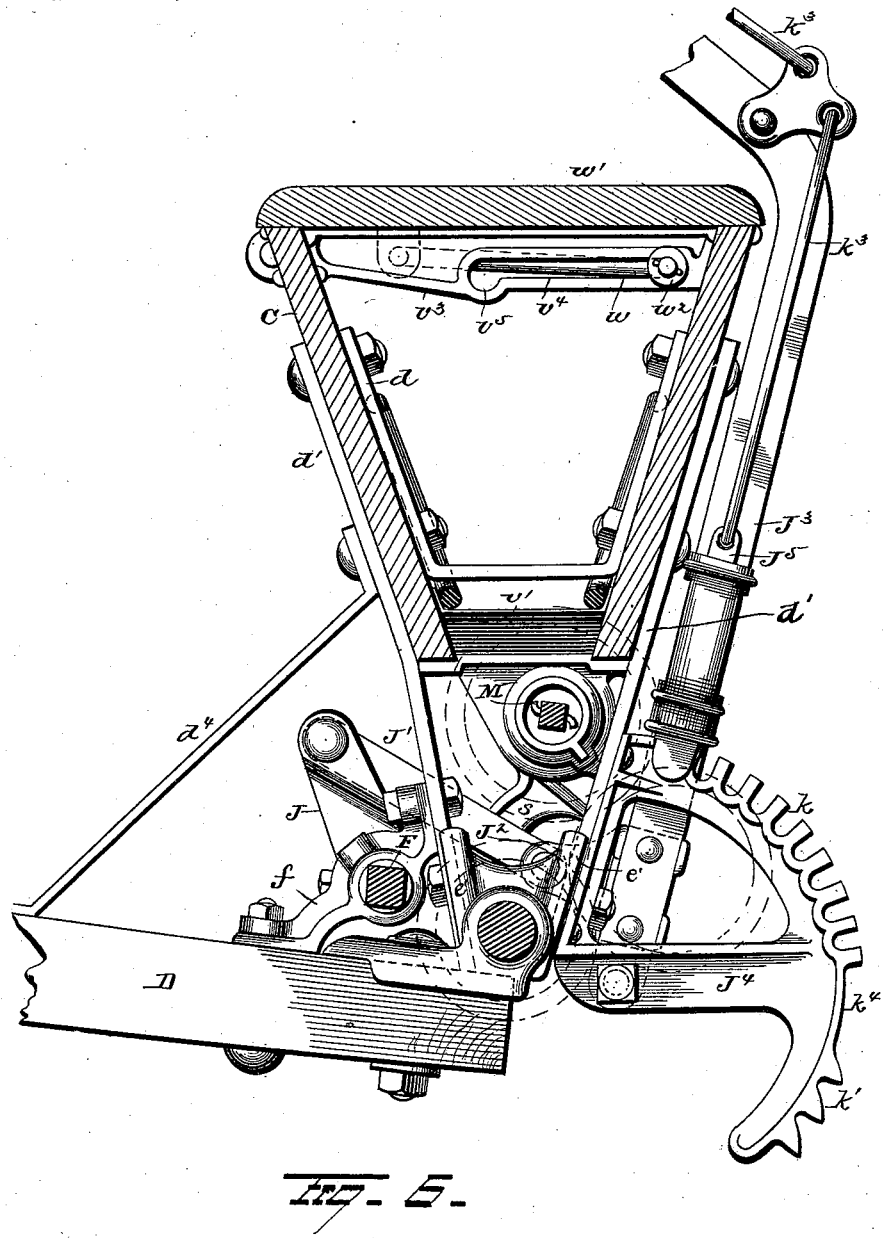

In the accompanying drawings, Figure 1 is a side elevation of our improved drill. Fig. 2 is a rear elevation of a section of the machine. Fig. 3 is a plan with the hopper removed. Fig. 4 is a view of the mechanism for operating the feed. Fig. 5 is a plan view illustrating the interior of the hopper. Fig. 6 is a sectional view on the line $x\,x$ of Fig. 3. Fig. 7 is a separate view of one of the feed-cases. Fig. 8 illustrates a sectional view through the axle of the presser-wheels.

A represents a rectangular frame made up of an angle-iron having bent or curved corners, across which brace-rods $a$ are secured, said frame comprising a front bar $b$ and side bars $b'$. Secured to the under side of the side bars $b'$, at points in proximity to their rear ends, are axle-boxes $c$, in which the axle B is mounted and adapted to carry fixed carrying-wheels B'. The axle-boxes $c$ are provided with oil-chambers $c'$, to which access may be had by an opening $c^2$ beneath the horizontal portion of the angle-iron side bars $b'$. By this arrangement the oil-chamber may be left open without danger of foreign matter finding its way therein, being protected by the formation of the side bars, and the use of plugs will thus be avoided.

Mounted on the side bars $b'$ of the frame A is a hopper C, provided internally at several points throughout its length with V-shaped braces $d$. Located on the exterior of the hopper C, parallel with the braces $d$, are brace-rods $d'$, to the lower ends of which truss-rods $d^2$ are attached, said truss-rods being secured at their forward ends to the front bar $b$ of frame A. The truss-rods (with the possible exception of the central one) are connected with the axle by means of loose collars $d^3$. Tongue D is supported by the front bar $b$ of the main frame and terminates at its rear end beneath the hopper C, and the hopper is preferably connected to said tongue by means of brace-rod $d^4$.

Secured to the tongue D is a casting E, having an integral sleeve $e$, adapted to serve as a bearing for the axle B. The casting E is also made with upwardly-projecting arms $e'$, to which the lower ends of two pair of the brace-rods $d'$ are secured by means of suitable bolts.

Projecting forwardly from each axle-box $c$ is an arm $e^2$, which terminates in a perforated boss $e^3$, in which latter the rounded ends of a preferably square shaft F are mounted. It is also preferable, for reasons which will appear hereinafter, to provide support for the shaft F intermediate of its ends, and for this purpose brackets $f$ are secured at one end to the tongue or shafts D and at their other ends to the brace-rods $d'$. Adjustably secured to the square shaft F is a series of arms F', adapted to normally project forwardly and upwardly and forked or bifurcated at their free forward ends to produce arms $f'$, between which a collar or sleeve $f^2$ is pivotally connected. Passing loosely through each sleeve $f^2$, and prevented from escape therefrom by a suitable key, is a rod G, each rod extending downwardly and connected at its lower end to a boot H, and encircling said rods are springs G', adapted to bear at their upper ends against the collars $f^2$ and at their lower ends against the boots H.

Secured to each boot H and projecting forwardly therefrom is a shoe H', said shoe being made of two plates, one at each side of the outlet of the boot, and connected together at their forward contracted ends, and are preferably made of steel. Secured to the forward ends of the shoes H' are the lower ends of rods $g$, (two of such rods for each shoe,) the upper ends of which are connected to drag-bars I. The forward ends of the drag-bars I are pivotally connected (in pairs) in clips $g'$, secured to the front bar $b$ of the main frame. These clips $g'$ may be conveniently made by bending up a sheet-metal plate to produce ears between which the drag-bars are pivotally connected. The forward ends of the drag-bars are connected to a perforated boss $g^2$ on the boots H, two drag-bars being connected to each boot. Also, pivotally connected to the bosses $g^2$ at each side of each boot H are rearwardly-extending bars $h$, between which a press-wheel $J^{10}$ is located and journaled therein. The hub of the press-wheels is provided with a recess or oil-chamber $i$, with which access may be had through an opening $i'$ in one side of a hollow projection $i^2$. By this means oil may be supplied to the oil-chamber and the opening $i'$ left open without danger of foreign matter finding its way into said oil-chamber. A sleeve $i^3$ is placed in the hub of the press-wheel, and said wheel is maintained in place by a pin $i^4$, passing through it and secured to the bars $h$. The bars $h$ are extended rearwardly beyond the press-wheel and have secured between them a scraper $j$ by means of a bolt $j'$. This scraper will be held firmly between the ends of the bars $h$; but by loosening the nut on one end of said bolt the scraper may be adjusted at will.

Secured adjustably to the shaft F, in close proximity to the castings E, are arms J, which project upwardly, and at their upper ends are bifurcated for the reception of one end of a link J', which is pivotally connected thereto. At its rear end said link J' is pivotally connected to an ear $J^2$, secured to and projecting from an operating-lever $J^3$ at a point near its lower end. The lower extremity of the lever $J^3$ is pivoted to a toothed segment $J^4$, secured to one of the brace-rods $d'$. The operating-lever $J^3$ extends upward and is bent forward and provided with a spring-actuated lock $J^5$, adapted to engage the teeth $k$ $k'$ of the toothed segment, and each lock $J^5$ is provided with a finger-bar $k^2$ and connecting levers $k^3$. A blank space $k^4$ is preferably left on the segment between the two sets of teeth, and the teeth $k'$ are preferably made in the form of ratchet-teeth. It will be seen that by operating the levers $J^3$ the shaft F will be rotated and the arms F' made to move up or down, and thus regulate the depth of the shoes in the ground, and locked in any desired position by the engagement of the locks $J^5$ with the teeth $k$ of the segment. When the lever $J^3$ is moved downwardly far enough to engage the teeth $k'$, the shoes and boots will be raised clear of the ground.

Located in the bottom of the hopper and secured thereto is a series of feed-cases L, having aligned openings $l l$ in their sides, and a compartment $m$. In the openings $l$ sleeves $l^2$ are inserted, and in the compartment $m$ of each case L is a disk or rosette $n$, having internal projections $n'$. Passing through the cases L is a feed-shaft M, on which ribbed feed-wheels $o$ are secured, the ribbed feed-wheels being adapted to engage between the projections on the disks or wheels $n$, and thus the feed-wheels will be properly supported within the feed-cases. The feed-cases L are open at their tops to communicate with the interior of the hopper, and are provided with openings O in their sides, through which the grain may pass to enter the tubes M', which convey it to the ground through the boots. Each feed-case is provided with two grooved flanges $o'$, adapted to receive two inwardly-projecting lugs $o^2$ on the mouth $o^4$ of the tubes M'. By this construction the tubes M' may be removed at will.

Secured to the feed-shaft M, preferably near each end thereof, are ribbed sleeves $p$, each adapted to carry a gear-wheel N, and secured to the axle of the machine immediately beneath the gear-wheels N are gear-wheels N'. Mounted loosely on the feed-shaft M is a sleeve or collar $q$ in proximity to each gear-wheel N, from which sleeves arms $q'$ project. Secured to each arm $q'$ is an arm $r$, in which is carried an idle gear-wheel $N^2$. Projecting upwardly and rearwardly from the arm $r$ is a shoulder $r'$, to which a spring-plate $r^2$ is secured at a point between its ends. The spring $r^2$ projects upwardly and is adapted to pass loosely through a loop $r^3$, secured to the hopper. The lower end of said spring-plate projects downwardly over the periphery of the idle-gear $N^2$ and serves to prevent trash, &c., from getting into the gearing. Said spring-plate also serves to normally force the idle-gear $N^2$ into mesh with the gear-wheel N', and thus transmit motion to the feed mechanism. Projecting forwardly from the arms $r$ is an arm $s$, adapted to be engaged by a cam $t$, carried by the shaft F, said cam being formed to produce two cam-surfaces $t'$ $t^2$, one above the other. The cam-surface $t'$ is adapted to be engaged normally by the arm $s$ when the gear $N^2$ is in mesh with the gear N', and thus prevent the gearing from cramping. When the levers are operated to raise the shoes and parts carried thereby, as previously explained, the turning of the shaft F will bring the cam-surface $t'$ into engagement with the arm $s$, and thus force the arm $r$, carrying the idle gear-wheel $N^2$, outward and against the action of the spring $r^2$, thus throwing the gear $N^2$ out of mesh with the gear N'. As the arm $r$ moves outwardly or rearwardly the arm $s$ will engage the axle, and thus prevent said arm $r$ from moving too far and thus binding. From this construction it will be seen that when the levers are operated the shoes and parts carried thereby will be raised and at the same operation the feed mechanism will be thrown out of gear. It will also be seen that should the machine be backed so as to cause the axle to rotate in the reverse direction the gear N' will ride over the teeth of the gear $N^2$ without rotating it, thereby preventing the rotating of the feed in the wrong or reverse direction.

In order to cause the press-wheels to run over the ground with a yielding pressure, a box $u$ is adjustably secured to each boot and a rod or rods $u'$ located therein, said rod or rods being provided at the lower end with a cross-bar $u^3$, adapted to bear on the bars $h$, springs $u^4$ being also located in the box $u$ and made to bear on the cross-bar $u^2$. By means of this construction when an obstruction is met with by the press-wheels said wheels will yield against the action of the spring or springs $u^4$.

The hopper will preferably be braced by means of rods $v$ extending longitudinally of the hopper within the same and secured to the ends thereof. Inside the hopper guard-plates $v'$ will preferably be secured thereto to prevent the grain from getting into the gearing. Other plates $v^2$ will preferably be placed within the hopper to direct the grain to the feed-cases. The hopper will be provided at its top with a cross-bar $v^3$, having an elongated recess $v^4$, said recess terminating at one end in a depression $v^5$. A rod $w$ is pivotally connected at one end to the hinged cover $w'$ of the hopper and at the other end is bent to project into the recess $v^4$, being provided at each side of said recess with washers or disks $w^2$. When the lid or cover $w'$ is raised, the projection at the lower end of rod or link $w$ will enter the depression $v^5$ and maintain the lid in its open position.

It will be seen that by constructing the feed-cases and gearing as above set forth the said feed-cases may be placed at any desired distance apart, and thus a greater or less number of them may be employed.

Having fully described our invention, what we claim as new, and desire to secure by Letters Patent, is—

1. In a grain-drill, the combination, with a frame, of drag-bars pivotally connected to the forward portion thereof, a boot bolted to the drag-bars, a shoe secured to the boot and connected to the drag-bars, bars pivotally connected to the bolt which secures the boot to the drag-bars, a press-wheel mounted in said pivoted bars, and a scraper carried by said pivoted bars, substantially as set forth.

2. In a grain-drill, the combination, with a frame, of drag-bars pivotally connected to the forward portion thereof, a shoe connected to the foot and to the drag-bars, bars pivotally connected to said foot, a press-wheel carried by said pivoted bars, and a spring-cushioned cross-bar adapted to be engaged by the pivoted bars, said cross-bar disconnected from the pivoted bars and adapted to be engaged by the latter when elevated beyond a certain point, substantially as set forth.

3. In a grain-drill, the combination, with a frame, of drag-bars pivotally connected thereto, a boot connected to drag-bars, a shoe connected to said boot and the drag-bars, bars pivoted to said boot and extending rearwardly therefrom, a press-wheel carried by said pivoted bars, a box on the boot, a spring in said box, and a rod also in said box and having a cross-bar disconnected from the pivoted bars and adapted to bear on the pivoted bars and be forced downwardly by said spring, substantially as set forth.

4. In a grain-drill, the combination, with an angle-iron frame, of journal-boxes secured to said frame, an axle journaled in said boxes, and wheels on the axle, said journal-boxes being provided with oil-chambers and the entrance to said oil-chambers being located immediately beneath the horizontal portion of the angle-irons, substantially as set forth.

5. In a grain-drill, the combination, with each boot, of bars connected thereto, a pin connecting said bars, a sleeve on said pin and a press-wheel on said sleeve, the hub of said press-wheel being provided with an oil-chamber, and a hollow projection on said hub, having an opening in its side through which access may be had to the oil-chamber, substantially as set forth.

6. In a grain-drill, the combination, with the axle and feed mechanism, of a gear on the axle, a gear carried by the feed mechanism, a loose arm carried by the feed mechanism, an idle-gear carried by the loose arm, a spring-plate secured to the loose arm for maintaining the idle-gear normally in mesh with the gear on the axle, and a stop or arm carried by the loose arm for preventing the gears from binding, substantially as set forth.

7. In a grain-drill, the combination, with the axle, hopper, and feed mechanism, of a gear carried by the axle, a gear carried by the feed mechanism, a loose arm carried by the feed mechanism, an idle-gear carried by the loose arm, a spring-plate secured to said loose arm and extending through a loop on the hopper and over the idle-gear, an arm projecting from the loose arm, a shaft mounted in the frame-work, and a cam on said shaft adapted to engage the arm projecting from the loose arm when said shaft is turned, and means for turning said shaft, substantially as set forth.

8. In a grain-drill, the combination, with the axle, of an angle-iron frame mounted thereon, a seed-box mounted on said frame, and truss rods and braces between said hopper and the forward end of the frame, substantially as set forth.

9. In a grain-drill, the combination, with the axle, of an angle-iron frame having bent corners, braces across said corners, a seed-box carried by said frame, and truss rods and braces between said hopper and the forward end of the frame, substantially as set forth.

10. In a grain-drill, the combination, with the axle, of an angle-iron frame having bent corners, braces across said corners, truss rods and braces connecting the hopper and forward end of the frame, and a tongue attached to the front end of the frame and adapted to extend beneath the seed-hopper and connected therewith, substantially as set forth.

11. In a grain-drill, the combination, with an axle, of a frame mounted thereon, a seed-hopper carried by said frame, truss rods and braces connecting the forward end of the frame with the seed-hopper, and drag-bars connected with said frame, substantially as set forth.

12. In a grain-drill, the combination, with an axle, of an angle-iron frame mounted thereon, braces across the corners of said frame, a seed-box carried by said frame, truss rods and braces connecting the forward end of the frame with the seed-hopper, drag-bars connected to said frame, and shoes and boots carried by said drag-bars, substantially as set forth.

13. The combination, with three shafts, gear-wheels on two of said shafts and a cam on the third, of a bracket on one shaft, a gear-wheel on said bracket, an arm projecting from the bracket and adapted to be operated upon by the cam, and a spring for holding the wheel on the bracket intermeshed with the wheel on one of the shafts, substantially as set forth.

In testimony whereof we have signed this specification in the presence of two subscribing witnesses.

WILLARD A. VAN BRUNT.
DANIEL C. VAN BRUNT.

Witnesses:
ARTHUR W. WILCOX,
JOHN BODDEN.